US008879859B2

(12) United States Patent
Cheong et al.

(10) Patent No.: US 8,879,859 B2
(45) Date of Patent: Nov. 4, 2014

(54) ANIMATED IMAGE CODE, APPARATUS FOR GENERATING/DECODING ANIMATED IMAGE CODE, AND METHOD THEREOF

(71) Applicants: Cheol Ho Cheong, Seoul (KR); Sang Yong Lee, Seoul (KR)

(72) Inventors: Cheol Ho Cheong, Seoul (KR); Sang Yong Lee, Seoul (KR)

(73) Assignees: Colorzip Media, Inc., Seoul (KR); Colorzip Technology Co., Ltd., Seoul (KR)

( * ) Notice: Subject to any disclaimer, the term of this patent is extended or adjusted under 35 U.S.C. 154(b) by 0 days.

(21) Appl. No.: 13/864,488

(22) Filed: Apr. 17, 2013

(65) Prior Publication Data

US 2013/0230241 A1 Sep. 5, 2013

Related U.S. Application Data

(62) Division of application No. 12/084,567, filed as application No. PCT/KR2006/004518 on Nov. 1, 2006, now Pat. No. 8,447,122.

(30) Foreign Application Priority Data

Nov. 11, 2005 (KR) .................. 10-2005-0108131
Mar. 17, 2006 (KR) .................. 10-2006-0024756

(51) Int. Cl.
| | | |
|---|---|---|
| G06K 9/36 | (2006.01) | |
| G06T 1/00 | (2006.01) | |
| G06K 19/06 | (2006.01) | |
| G06T 9/00 | (2006.01) | |
| G06K 9/46 | (2006.01) | |

(52) U.S. Cl.
CPC . *G06T 9/00* (2013.01); *G06T 1/005* (2013.01); *G06T 1/0085* (2013.01); *G06T 2201/0065* (2013.01); *G06K 19/06037* (2013.01); *G06T 1/0028* (2013.01)
USPC ........................................... 382/233

(58) Field of Classification Search
CPC ....................... G06T 13/00; G06T 2213/00
USPC ......... 382/154, 162, 164, 166, 172, 173, 178, 382/232, 233; 375/130, 240.01, 240.02, 375/240.19; 715/202, 501.1; 345/473, 545
See application file for complete search history.

(56) References Cited

U.S. PATENT DOCUMENTS

| 4,692,880 A | 9/1987 | Merz et al. |
|---|---|---|
| 4,727,365 A | 2/1988 | Bunker et al. |

(Continued)

FOREIGN PATENT DOCUMENTS

| GB | 1221842 | 2/1971 |
|---|---|---|
| JP | 62-111367 | 5/1987 |

(Continued)

OTHER PUBLICATIONS

Office Action for Japanese Patent Application No. 2008-539918, dated Apr. 25. 2011.

(Continued)

*Primary Examiner* — Amir Alavi
(74) *Attorney, Agent, or Firm* — Nixon & Vanderhye, PC

(57) ABSTRACT

An apparatus for generating/decoding an animated image code, and a method thereof. The animated image code frame includes an image code frame which is divided into code cells expressing minimum unit data, and in which the minimum unit data is expressed in an area located inside the code cells and is formed by combining one or more color, gradation, and patterns; and a design layer which is formed by combining color or gradation used in the image code frame and color or gradation distinguishable on the basis of a threshold value, and which is displayed by overlapping the frame image. By utilizing changes in respective animated frames, an animated image code can be generated and decoded in which motion can be expressed by using a display medium.

3 Claims, 11 Drawing Sheets

(56) References Cited

U.S. PATENT DOCUMENTS

| | | | |
|---|---|---|---|
| 4,922,340 A | 5/1990 | Iwai | |
| 6,164,552 A | 12/2000 | Sato | |
| 6,574,364 B1 | 6/2003 | Economidis et al. | |
| 6,674,893 B1 | 1/2004 | Abe et al. | |
| 7,020,327 B2 | 3/2006 | Tack-don et al. | |
| 7,120,205 B2 | 10/2006 | Salehi et al. | |
| 8,130,226 B2 * | 3/2012 | Brunner et al. | 345/473 |
| 8,199,810 B2 * | 6/2012 | Mabey et al. | 375/240.01 |
| 8,447,122 B2 * | 5/2013 | Cheong et al. | 382/232 |
| 2004/0054965 A1 * | 3/2004 | Haskell et al. | 715/501.1 |
| 2004/0076310 A1 | 4/2004 | Hersch et al. | |
| 2010/0246984 A1 | 9/2010 | Cheong et al. | |
| 2013/0230241 A1 * | 9/2013 | Cheong et al. | 382/166 |

FOREIGN PATENT DOCUMENTS

| | | |
|---|---|---|
| JP | 06-119078 | 7/1994 |
| JP | 08-123923 | 5/1996 |
| JP | 08-171628 | 7/1996 |
| JP | 09-054838 | 2/1997 |
| JP | 11-120284 | 4/1999 |
| JP | 2000-003406 | 1/2000 |
| JP | 2000-348127 | 12/2000 |
| JP | 2001-195536 | 7/2001 |
| JP | 2002-111809 | 4/2002 |
| JP | 2002-245399 | 8/2002 |
| JP | 2003-125361 | 4/2003 |
| JP | 2004-078351 | 3/2004 |
| JP | 2004-228720 | 8/2004 |
| JP | 2005-164655 | 6/2005 |
| JP | 2005-182649 | 7/2005 |
| KR | 10-2001-0087787 | 9/2001 |
| KR | 10-2006-0044805 A | 5/2006 |
| KR | 10-2006-0044806 A | 5/2006 |
| WO | WO 0186582 A1 | 11/2001 |
| WO | 02/21441 | 3/2002 |
| WO | 2005/043454 | 5/2005 |

OTHER PUBLICATIONS

International Search Report for PCT/KR2006/004518 dated Feb. 15, 2007.
Written Opinion of the International Searching Authority dated Feb. 15, 2007.
European International Search Report dated Nov. 7, 2008 for European Patent Application 06 812 357.9-1522/1952338.
Office Action (Extended Supplementary European Search Report) dated Nov. 18, 2008 for European Patent Application 06 812 357.9-1522/1952338.
(XP002501544) Yves; "QR codes are so 2004. Get Ready for ColorCode"; Apr. 22, 2005, pp. 1-7.
(XP011193879) Kato H. et al.: "Pervasive 2D Barcodes for Camera Phone Applications"; IEEE Pervasive Computing, IEEE Service Center, Los Alamitos, CA, US, vol. 6, No. 4, Oct. 1, 2007, pp. 76-85.
(XP010750825) Ohbuchi E. et al.: "Barcode Readers using the Camera Device in Mobile Phones", Cyberworlds, 2004 International Conference on Tokyo, Japan, Nov. 18-20, 2004, Piscataway, NJ, USA, IEEE, Nov. 18, 2004, pp. 260-265.
Office Action (in English) dated Jun. 29, 2012 of Indian Patent Application No. 1139/MUMNP/2008 which corresponds to U.S. Appl. No. 12/084,567.

* cited by examiner

ANIMATED IMAGE CODE, APPARATUS FOR GENERATING/DECODING ANIMATED IMAGE CODE, AND METHOD THEREOF

This application is a divisional of U.S. patent application Ser. No. 12/084,567, filed on 8 Jun. 2010, now U.S. Pat. No. 8,447,122 which is the U.S. national phase of International Application No. PCT/KR2006/004518 filed 1 Nov. 2006, which designated the U.S. and claims priority to Korean Application No. 10-2005-0108131 filed 11 Nov. 2005 and Korean Application No. 10-2006-0024756 filed 17 Mar. 2006, the entire contents of each of which are hereby incorporated by reference.

TECHNICAL FIELD

The present invention relates to an image code displayed on a display medium, and more particularly, to a method and apparatus for generating/decoding an animated image code capable of expressing motion on a display medium.

BACKGROUND ART

With the emergence of a mobile computing environment, an interface technique has become popular in which an image is recognized by a camera, and content information stored in a computer or a server on a network is used according to information extracted from the recognized image.

In particular, recognition of an image code such as a one-dimensional bar code, a two-dimensional black and white code, or a two-dimensional color code has attracted interest. This is because privacy is less likely to be violated when the image code is used than when biometrics or a wireless tag is used. In addition, a mobile phone or personal digital assistant (PDA) can recognize the image code using a camera embedded therein.

The image code has been conventionally utilized in the distribution sector and product management sector. Furthermore, the image code is widely used in other sectors including wireless-based multimedia content, business card information, advertisement, and online shopping mall access.

In general, the image code is expressed by using a specific pattern, and thus the image code has a fixed shape. As a result, the design of the image code is generally limited. For this reason, the image code may not be very suitable for the medium to which the image code is attached.

Recently, it has become more common that the image code is not only attached to a printing medium such as a sheet of paper but also expressed on a display medium such as a digital television set (DTV), a liquid crystal display (LCD), or a cathode ray tube (CRT). The image code is visually less sophisticated when expressed on a display medium than when a printing medium is used.

If a two-dimensional black and white code composed of patterns and pixels is displayed on a display medium, there is a problem not only in terms of design but also in terms of recognition. That is, the two-dimensional code can express a square pattern, a rectangular pattern, or a circular pattern, and these patterns may be blurred or distorted when they are expressed with pixels of the display medium.

Meanwhile, the display medium may have rectangular-shaped pixels. A boundary line may be present between the pixels. A luminance phenomenon may occur due to backlight, which may result in significantly damaging an image code having a small pattern. Since a CRT screen is not flat but curved, an image code displayed on the CRT is also curved and significantly distorted.

DISCLOSURE OF INVENTION

Technical Problem

The present invention provides an animated image code capable of expressing motion on a display medium.

The present invention also provides a method and apparatus for generating an animated image code capable of expressing motion on a display medium.

The present invention also provides a method and apparatus for decoding an animated image code capable of expressing motion on a display medium.

Technical Solution

According to an aspect of the present invention, there is provided an animated image code, comprising: an image code frame which is divided into code cells expressing minimum unit data, and in which the minimum unit data is expressed in an area located inside the code cells and is formed by combining one or more color, gradation, and patterns; and a design layer which is formed by combining one or more color or gradation distinguishable from the color or gradataion used in the image code frame on the basis of a threshold value.

According to another aspect of the present invention, there is provided an apparatus for generating an animated image code displayed on a display medium, the apparatus comprising: a frame image generator which generates an image code frame expressing information by combining one or more color, gradation, and patterns; a design layer generator which generates a layer image formed by combining one or more color or gradation distinguishable from the color or gradation used in the image code frame on the basis of a threshold value; a varying image generator which generates one or more image code frames or layer images which show sequential changes in a portion of the layer image; and an animated image code generator which generates respective frames constituting the animated image code by overlapping the image code frame and the layer image.

According to another aspect of the present invention, there is provided a method of generating an animated image code displayed on an image display unit, the method comprising: generating an image code frame expressing information by combining one or more color, gradation, and patterns; generating a layer image formed by combining one or more color or gradation distinguishable from the color or gradation used in the image code frame on the basis of a threshold value; generating one or more image code frames, which show sequential changes in a portion of the layer image, or layer images; and generating respective frames constituting the animated image code by overlapping the image code frame and the layer image.

According to another aspect of the present invention, there is provided an apparatus for decoding an animated image code, the apparatus comprising: a code input unit which receives the animated image code displayed on a display medium optically or in the form of an electronic file; a code divider which divides the animated image code into an image code frame and a design layer; and a decoder which decodes the image code frame and extracts information based on the motion of the design layer.

According to another aspect of the present invention, there is provided a method of decoding an animated image code, the method comprising: receiving the animated image code displayed on a display medium optically or in the form of an electronic file; dividing the animated image code into an image code frame and a design layer; and decoding the image code frame and extracting information based on the motion of the design layer.

Advantageous Effects

According to the present invention, a medium-friendly designed image code is provided through various display devices such as a television set (TV), a monitor, an electronic bulletin board, a mobile phone, a personal digital assistant (PDA), and a liquid crystal display (LCD). When decoding is difficult to carry out due to characteristics of a display medium or the occurrence of distortion, information of consecutive image code frames are combined, thereby improving decoding performance. Therefore, when an animated image code is expressed with pixels of the display medium, even if an image is blurred or distorted, the problem can be solved by combining consecutive images. Furthermore, distortion caused by a boundary line between pixels of the display medium and a luminance phenomenon caused by backlight can be prevented. For example, when a cathode ray tube (CRT)-type TV or monitor is used, a Moire phenomenon occurs, that is, a black or gray line appears on a screen.

The animated image code of the present invention can provide various information services in association with a digital television (DTV) and a computer. Examples of the services include a network information access service (e.g. advertisement information and a shopping mall), an information service related to sports broadcasting providing information on a player and game, a service for downloading a coupon and a scheduled recording service. In addition, the animated image code in which a color code is transformed becomes similar to a logo in terms of its shape and format. Therefore, an image code having a logo format can be achieved and recognized.

BEST MODE

Figure 1A:
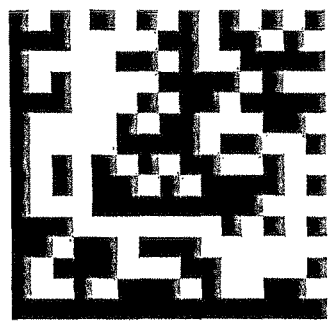
FIGS. 1A to 1D illustrate examples of conventional image codes.

According to an aspect of the present invention, there is provided an animated image code, comprising: an image code frame which is divided into code cells expressing minimum unit data, and in which the minimum unit data is expressed in an area located inside the code cells and is formed by combining one or more color, gradation, and patterns; and a design layer which is formed by combining one or more color or gradation distinguishable from the color or gradataion used in the image code frame on the basis of a threshold value.

According to another aspect of the present invention, there is provided an apparatus for generating an animated image code displayed on a display medium, the apparatus comprising: a frame image generator which generates an image code frame expressing information by combining one or more color, gradation, and patterns; a design layer generator which generates a layer image formed by combining one or more color or gradation distinguishable from the color or gradation used in the image code frame on the basis of a threshold value; a varying image generator which generates one or more image code frames or layer images which show sequential changes in a portion of the layer image; and an animated image code generator which generates respective frames constituting the animated image code by overlapping the image code frame and the layer image.

According to another aspect of the present invention, there is provided a method of generating an animated image code displayed on an image display unit, the method comprising: generating an image code frame expressing information by combining one or more color, gradation, and patterns; generating a layer image formed by combining one or more color or gradation distinguishable from the color or gradation used in the image code frame on the basis of a threshold value; generating one or more image code frames, which show sequential changes in a portion of the layer image, or layer images; and generating respective frames constituting the animated image code by overlapping the image code frame and the layer image.

According to another aspect of the present invention, there is provided an apparatus for decoding an animated image code, the apparatus comprising: a code input unit which receives the animated image code displayed on a display medium optically or in the form of an electronic file; a code divider which divides the animated image code into an image code frame and a design layer; and a decoder which decodes the image code frame and extracts information based on the motion of the design layer.

According to another aspect of the present invention, there is provided a method of decoding an animated image code, the method comprising: receiving the animated image code displayed on a display medium optically or in the form of an electronic file; dividing the animated image code into an image code frame and a design layer; and decoding the image code frame and extracting information based on the motion of the design layer.

MODE FOR INVENTION

FIGS. 1A to 1D illustrate examples of conventional image codes.

Figure 1B:
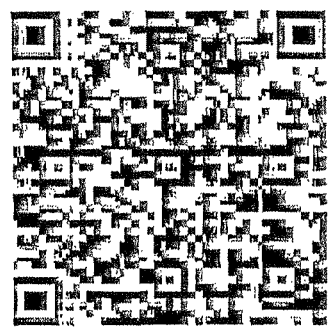
Figure 1C:
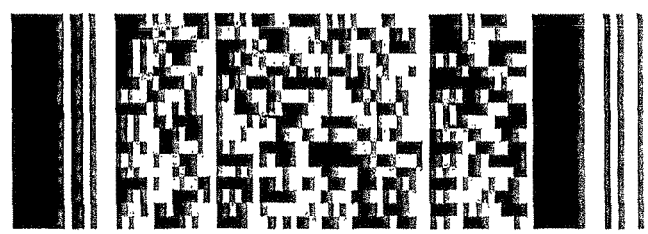
Figure 1D:
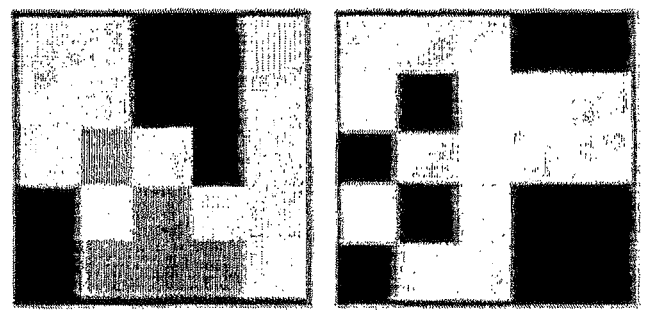

FIG. 1A illustrates a data matrix. FIG. 1B illustrates a quick response (QR) code. FIG. 1C illustrates a PDF-417 code. FIG. 1D illustrates a color code and a gray code. Various types of one-dimensional and two-dimensional image codes may be used in the present invention apart from the image codes shown in FIGS. 1A to 1D.

An animated image code of the present invention is composed of a plurality of image code frames. The image code frames are sequentially displayed for a predetermined time on a display medium (e.g. cathode ray tube (CRT) monitor, liquid crystal display (LCD) monitor, and plasma display panel (PDP) monitor). When image code frames each having a slightly different pattern are displayed at the rate of over ten frames per second, the image code is viewed as an animated image. When 24 frames are displayed per second, an animated image code is viewed in a manner that appears natural.

Figure 2:
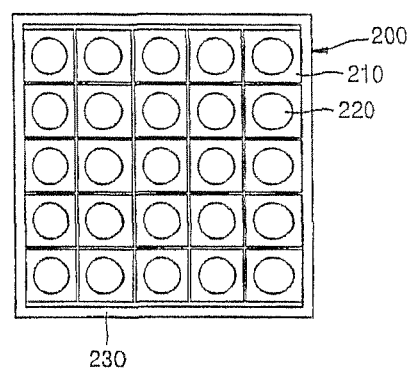
FIG. 2 illustrates an image code frame constituting an animated image code according to an embodiment of the present invention.

FIG. 2 illustrates an image code frame constituting an animated image code according to an embodiment of the present invention.

Referring to FIG. 2, an image code frame 200 constituting an animated image code is divided into code cells 210 which are basic unit areas for expressing minimum unit data of an image code (that is, areas including minimum data required for decoding). Data is expressed on an area 220 in the code cells 210. According to the type of image code, the code cells 210 may be adjacent to one another or separated from one another. Preferably, the code cells 210 are located in a feature pattern 230. The area 220 which is located in the code cell 210 and displays data may be formed so as to have a shape proportional to a pixel shape of a display medium that displays the animated image code.

The feature pattern 230 shows information on location, size, and rotation direction of an image code frame. When a typical one-dimensional bar code frame is used, the feature pattern 230 may be a guide pattern arranged at the left and right sides of the code frame. When a two-dimensional black and white code frame is used, the feature pattern 230 may be a code finder pattern or an alignment pattern. When a color code frame is used, the feature pattern 230 may be a feature point (vertex) of code, or an outline. Preferably, the feature pattern 230 is fixedly located at the same position on the plurality of image code frames constituting an animated image, so as to easily recognize the size and location of the image code frame 200 even when the image code frame 200 rotates, or when a certain area is altered. The feature pattern 230 used in the image code frame 200 may use the feature pattern of the one-dimensional bar code or the two-dimensional black and white code. Alternatively, a new feature code may be defined by using the code cells 210 of the image code frame 200. Furthermore, the feature pattern 230 may be expressed on a design layer overlapping the image code frame 200. Another image code, image, or number may be expressed on the design layer. The configuration of an image code overlapping below another design layer is disclosed in Korea Patent Application No. 2005-25239 and Korea Patent Application No. 2005-25240.

When the code cells 210 are located inside the feature pattern 230 of the image code frame 200, sampling can be easily performed in order to recognize the feature pattern 230 and the code cells 210. This is because a central point is defined according to a predetermined interval or at a predetermined proportion, and according to the defined central point, pixels around the defined central point are sampled.

Figure 3A:
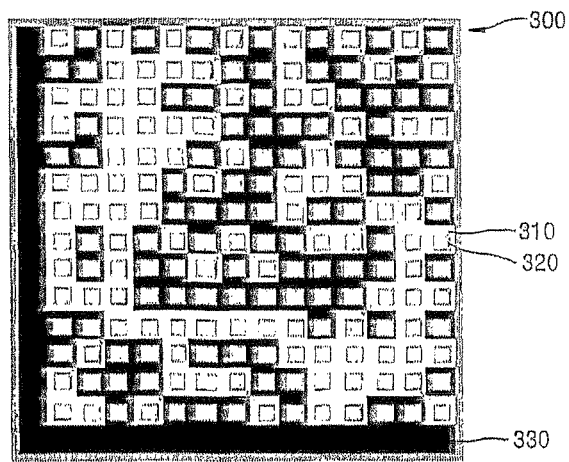
FIGS. 3A and 3B illustrate examples of image code frame according to an embodiment of the present invention respectively having a matrix shape and a layer shape.
Figure 3B:
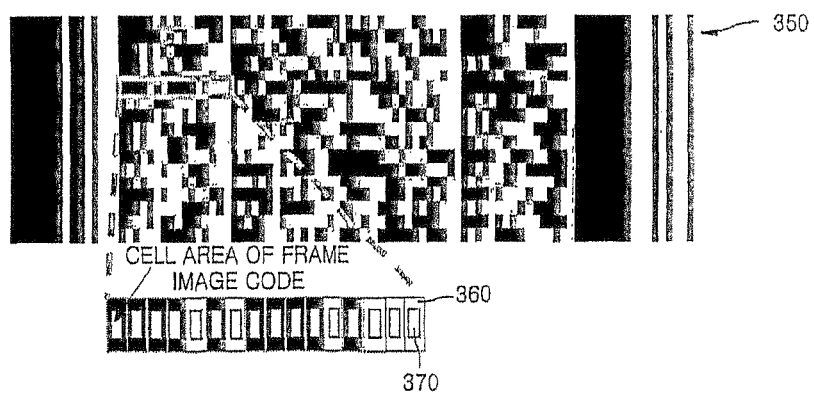

FIGS. 3A and 3B illustrate examples of image code frame of the present invention respectively having a matrix shape and a layer shape.

In general, most image codes, excluding a color code and an ultra code, are expressed by combining black and white colors, or expressed with patterns. When the image code is expressed by combining black and white colors, the image code is divided into unit areas. A black and white figure having a specific shape is arranged on each unit area. When the image code is expressed with patterns, figures each having a specific shape and thickness are arranged thereon. A two-dimensional image code having a matrix shape is generally expressed by dividing a data area into unit areas. A two-dimensional image code having a layer shape is expressed by further adding patterns horizontally and vertically for data expression. In general, the patterns have the shape of a black and white bar.

When an image code having a matrix shape is used, the conventional image codes mentioned above are generated as the image code frame 200 of the present embodiment when a figure having a specific shape whose central point coincides with the center of each unit area is defined as a cell (FIG. 3A). When the image code having a layer having a particular shape is used, the image code is divided according to a minimum unit pattern thickness. Thereafter, circular or rectangular areas in the center thereof are defined as a cell (FIG. 3B).

For example, the image code having a layer has a minimum thickness pattern expressed by a black and white bar of a guide bar. The length of each pattern is a multiple integer of the length of this black and white bar. Therefore, all the image codes can be divided into cells in the unit of black and white bar. Some of the image codes having a matrix shape may express data according to the size of the figure arranged inside the basic unit area. In this case, the image codes are divided into cells having a basic size, whereby a maximum size and a minimum size can be both expressed by an integer multiple.

Figure 4A:
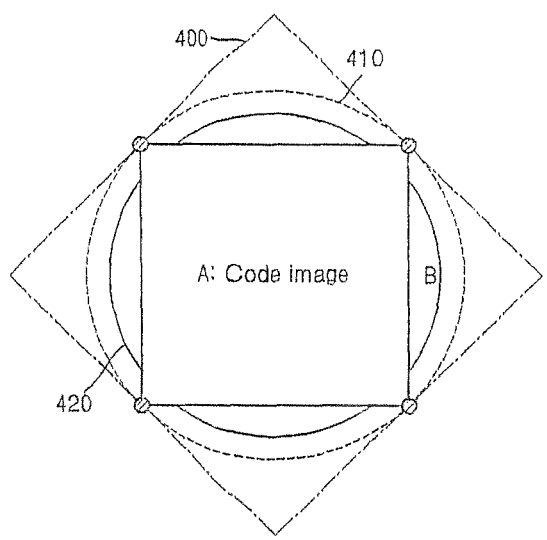
FIGS. 4A to 4C illustrate design layer areas overlapping image code frames.
Figure 4B:
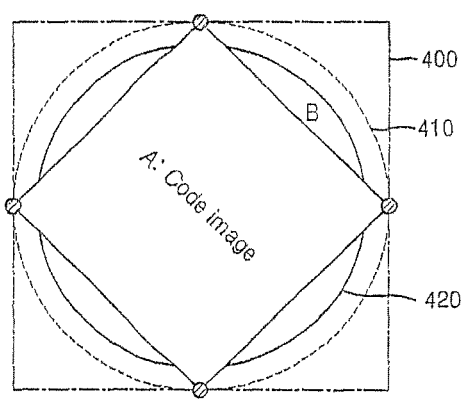
Figure 4C:
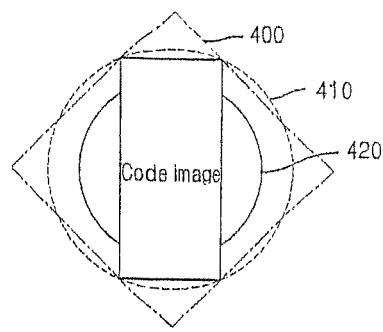

FIGS. 4A to 4C illustrate design layer areas overlapping image code frames.

A design layer can be designed so as to be expressed by overlapping an image code area or by being synthesized with a cell or a feature pattern. The design layer modifies the format, shape, color, and size of the image code frame under the condition that minimum information required for decoding of the image code frame (e.g. information on color, brightness, and size expressed in a code cell of the image code frame) and a characteristic of a feature pattern is maintained.

Furthermore, the design layer provides additional information depending on the changes in the design layer of the previous and next image code frames. For example, the additional information may be provided according to the variations in size and rotation direction of a design component at a specific area of the design layer.

Data corresponding to additional information depending on the changes in the design layer is shown in Table 1.

TABLE 1

| | Example of data expression depending on variation of specific design component in the design layer | Examples of data expression |
|---|---|---|
| Size | Express level according to maximum size vs. minimum size | V0, V1, . . . Vn |
| Speed | Express level of design component changing every second | S0, S1, . . . Sn |
| Rotation | Express rotation of design component | R0, R1, . . . Rn |
| Motion | Express motion direction of design component | M0, M1, . . . Mn |
| Area | Information on cell area influenced by design component | A1, A2, . . . An |

Changes in the animated image code may be expressed by the motion of not only the design layer but also the image code frame. For example, when the image code frame rotates clockwise, additional data may be added to the animated image code according to the rotation direction of the image code frame. In other words, additional data based on the rotation direction of the image code frame can be extracted in the process of decoding the animated image code.

An expression area for the design layer may deviate from that of the image code frame. A boundary square 400 is defined as the widest square that is circumscribed to the vertices, that is, the feature pattern of the image code frame. A code rotation area 410 is defined as a circular or elliptical area that is inscribed to the vertices of the image code frame.

Referring to FIG. 4A, a circular or elliptical area 420 narrower than the code rotation area 410 includes a portion B outwardly deviated from an image code A. In this case, the deviated portion B is not interfered with by the vertices of the feature pattern of the image code frame. Thus, an image can be added in the portion B. Accordingly, all areas narrower than the code rotation area 410 can be the expression area of the design layer.

FIG. 4B illustrates a possible expression area of the design layer when the code image frame has rotated. FIG. 4C illustrates a possible expression area of the design layer when the code image frame is rectangular shaped. The expression areas of the design layer can deviate from the area of the image code. Thus, the animated image code can be generated as a further visually aesthetic image, and data can be additionally provided.

Figure 5:
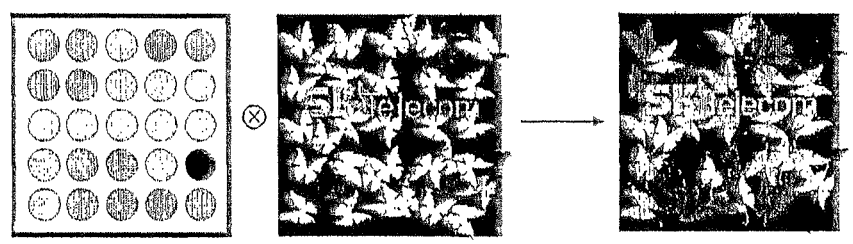
FIG. 5 illustrates a frame of an animated image code generated by overlapping an image code frame and a design layer according to an embodiment of the present invention.

FIG. 5 illustrates a frame of an animated image code generated by overlapping the image code frame and the design layer according to an embodiment of the present invention.

Figure 6:
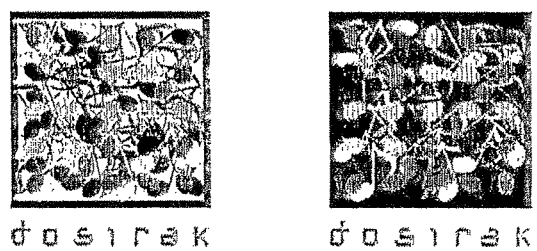
FIG. 6 illustrates a frame of an animated image code generated by overlapping an image code frame and a design layer according to another embodiment of the present invention.

Referring to FIG. 5, a color code is divided into code cells. A data expression area having an elliptical shape is formed inside each code cell so as to express data within the data expression area. An image code frame is thus generated for the color code. Then, a design layer including, for example, a butterfly pattern is generated. The design layer does not have to be located within the image code frame as shown in FIGS. 4A to 4C. Thus, as long as the recognition of the image code frame is not affected, the design layer may be located at an area that deviates from the image code frame. The image code frame and the design layer generated as described above overlap each other, thereby generating frames of an animated image code. Once the frames are generated, tens of frames can be displayed every second, thereby expressing the animated image code. FIG. 6 illustrates an animated image frame generated using the same method as illustrated in FIG. 5 according to another embodiment of the present invention.

Figure 7A:
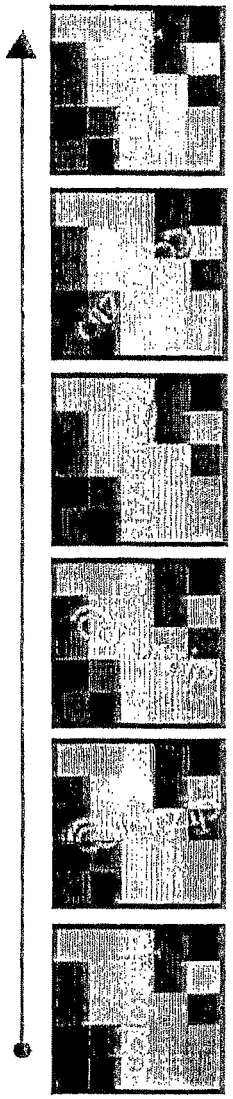
FIGS. 7A and 7B illustrate motional changes in a design layer.
Figure 7B:
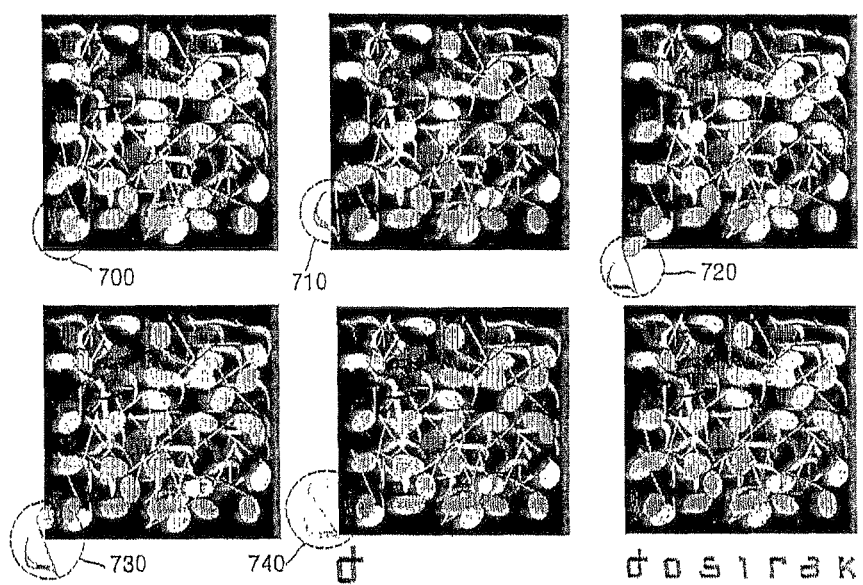

FIGS. 7A and 7B illustrate motional changes in a design layer.

Referring to FIG. 7A, a character set 'colorzip' is present in a design layer overlapping a color code. The character rotates clockwise while the animated image code is displayed. Referring to HG. 7B, the animated image frame expressed by overlapping the color code and a specific design component is shown with an animated musical note 700 to 740 at the lower left portion.

When data is added by changing the animated image code, a start point and an end point of changes in the animated image code have to be detected in order to be able to sort the animated image code. The changes in the animated image codes can be classified into a linear transform and a recursive transform. In each case, the start point and the end point of changes can be detected as follows.

A linear transform method is similar to a method in which the same animated image code is repeatedly shown when an initial image and a final image of the animated image code are different from each other (see FIG. 7B). The animated image code is continuously captured, so that a preceding image from among two consecutive images having greatest changes is defined as a final image, and the following image thereof is defined as an initial image. The animated image code is sorted again in the order in which its patterns change from the initial image to the final image.

A recursive transform method is used when an authentic initial image cannot be found because the animated image code is gradually changed and repeated. In this case, a reference image is determined and sorted according to a specific rule.

Figure 8:
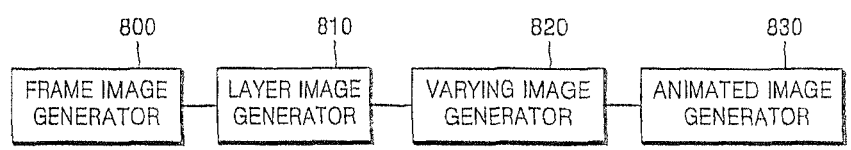
FIG. 8 illustrates the structure of an apparatus for generating an animated image code according to an embodiment of the present invention.

FIG. 8 illustrates the structure of an apparatus for generating an animated image code according to an embodiment of the present invention.

Referring to FIG. 8, the apparatus includes a frame image generator 800, a layer image generator 810, a varying image generator 820, and an animated image generator 830. The animated image code is displayed on an image display unit, and is composed of a plurality of image code frames. A design layer may overlap the image code frames. The animated image code allows information to be contained in the design layer, or may include additional information due to changes in the image code frames or a design layer.

The frame image generator 800 generates an image code frame in which specific information is encoded. The frame image generator 800 selects an image code, suitable for expressing information, from various image codes such as a one-dimensional bar code, a two-dimensional black and white code, and a two-dimensional color code. Furthermore, the frame image generator 800 generates error handling data (error recognition and correction) and data representing additional information (format, version, etc) according to a method of generating the selected image code, and also generates a feature pattern (finder pattern, a feature point, outline, etc).

The frame image generator 800 divides the image code into code cells, and encodes information (including basic data, error handling data, additional information data, a feature pattern, etc.) on figures that are each located inside the code cells and have a specific shape. Code cells and a basic feature pattern as shown in FIG. 2 express the image code frame generated by the frame image generator 800. The code cells may have the same size as an expression area for minimum unit data of an image code. In this case, the expression area for minimum unit data is regarded as a code cell. Otherwise, data is expressed with a predetermined size or a proportion rate from the center of the code cell. A boundary line may be inserted between the code cells. However, when the overlapping of the design layer is taken into account, it is preferable that the boundary line be removed in order to achieve a natural design.

The layer image generator 810 generates a design layer to be displayed by overlapping above the image code frame. Another image code, image, and logo may be arranged in the design layer. As shown in FIGS. 4A to 4C, these images can be arranged outside the area of the image code frame by the layer image generator 810 as long as the recognition of a feature pattern of the image code frame is not affected.

The varying image generator 820 determines how the animated image code will change. The animated image code displayed on the display medium can express its motion by using different shapes of the respective frames. The motion can be expressed in the image code frame or the design layer, or in both of them.

For example, if specific information is intended to be mapped to the rotation of the design layer, key frames for mapping the information have to be set. That is, the key frames are set by changing the design layer (and/or image code frame) by a unit of 45 degrees, such as, 0, 45, 90, 135, and 180 degrees. The specific information is mapped to each key frame. In addition, the varying image generator 820 can map information such as variations in size and speed for respective processes as shown in Table 1.

It is not mandatory for the varying image generator 820 to map the information according to the changes in the animated image code. Thus, only aesthetic change may be set. Preferably, the varying image generator 820 maps motion-based information so that changes between frames are different to some extent in order to facilitate a decoding process.

In addition, it is preferable that an image of the initial frame is significantly different from an image of the final frame so that a start point and an end point of the animated image code can be distinguished. If the animated image code is recursive, the start point and the end point are recognized when all patterns of animated image code do not rotate, when a mark indicating the start and end points is shown in a certain area, or when the size of a pattern is maximized or minimized.

After each motion-based frame is set, and the start point and the end point are distinguished, the varying image generator 820 generates frames based on motion. A natural animated image is generated by sequentially displaying tens of frames per minute. Thus, each frame based on motion has to be generated. The varying image generator 820 uses an interpolation technique, that is, a morphing technique, and thus generates changes in a plurality of frames between key frames. Another technique may be used when the varying image generator 820 generates each frame based on motion.

The animated image generator 830 synthesizes an image code frame and a design layer for each frame. Furthermore, the animated image generator 830 maps basic colors to design components arranged in the design layer. Each design component has values for color, brightness, and gradation. A natural color may be assigned to a design component which is not mapped to a cell of the image code frame or a feature pattern.

The animated image generator 830 assigns values for color, brightness, and gradation value based on a cell color to a design component of a design layer which is mapped to a code cell of the image code frame. For example, a design component mapped to one code cell may be assigned a color, brightness, and gradation of a code cell without alteration. On the other hand, a design component including a plurality of code cells may be assigned a different color, brightness, and gradation based on each code cell in suitable areas. If the image code frame has a color code, as shown in FIG. 5, a design component in a design layer maintains the color of a code cell, and is expressed as one or more design components through gradation and brightness. Once each frame based on motion is completed, the frames are sequentially displayed according to a time sequence, thereby expressing the animated image code.

Although it has been described with reference to FIG. 8 that the image code frame overlaps the design layer to form the frame of the animated image code, the frame of animated image code may be formed using only the image code frame. When the animated image code is generated using only the image code frame, the layer image generator 810 is omitted, and the varying image generator 820 generates various image code frames that are required to obtain the animated image code. Furthermore, the animated image generator 830 sequentially displays the generated image code frames.

Figure 9:
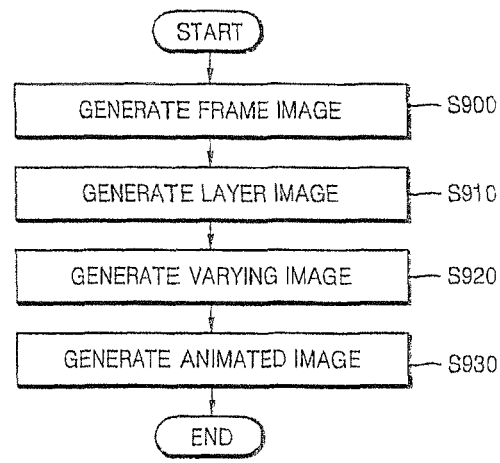
FIG. 9 is a flowchart of a method of generating an animated image code according to an embodiment of the present invention.

FIG. 9 is a flowchart illustrating a method of generating an animated image code according to an embodiment of the present invention.

Referring to FIG. 9, image code frames constituting an animated image code are generated by combining one or more color, brightness, and pattern (operation S900). In the image code frames, one-dimensional or two-dimensional image codes are divided into code cells. An area located inside the code cell and having a specific shape is defined as an expression area for minimum unit data.

A layer image is generated, wherein the layer image is formed by combining color or gradation used in the image code frame with color or gradation distinguishable according to a predetermined threshold value (operation S910). The layer image may be arranged farther outside the image code frame as long as a feature point of the image code frame is not interfered with.

One or more image code frames or layer images are generated which express sequential changes occurring at a portion of the image code frame or layer image (operation S920). Frames generated by overlapping the image code frames and the layer images are sequentially displayed on the display medium (operation S930).

Figure 10:
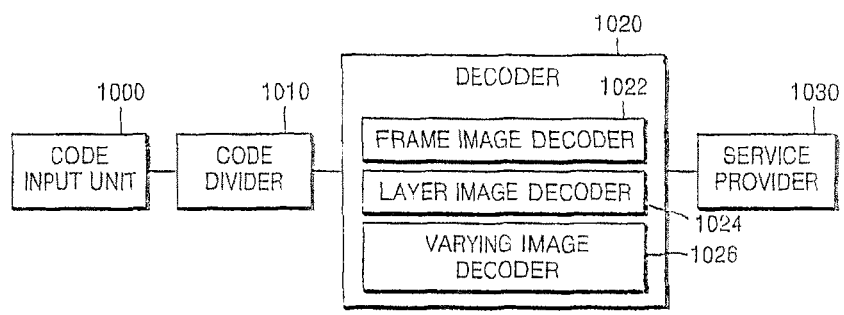
FIG. 10 illustrates the structure of an apparatus for decoding an animated image code according to an embodiment of the present invention.

FIG. 10 illustrates an apparatus for decoding an animated image code according to an embodiment of the present invention.

Referring to FIG. 10, the apparatus includes a code input unit 1000, a code divider 1010, a decoder 1020, and a service provider 1030. The decoder 1020 includes a frame image decoder 1022, a layer image decoder 1024, and a varying image decoder 1026.

The code input unit 1000 receives an animated image displayed on an image display unit. Specifically, the code input unit 1000 receives the animated image optically by means of an optical reader such as a camera and a scanner. Alternatively, the animated image is received in response to a scan line signal of the image display unit, or received in the form of an electronic file. When the animated image is optically received, the code input unit 1000 reads the animated image with a predetermined time interval.

The code divider 1010 extracts an animated image code from the received animated image, and divides the animated image code into an image code frame and a design layer so as to recognize motion expressed by the animated image code.

Specifically, the code divider 1010 performs binarization, residual image removal, and boundary detection so that the received animated image code is extracted separately from a background area.

The binarization is defined as a process of converting the received animated image code into a binary format of black and white colors. The code divider 1010 calculates a brightness value (a value Y in the case of a YUV color model) of an input color image, and forms a histogram by using the brightness value. Then, the histogram is equalized, and a binarization threshold value is obtained. The code divider 1010 optionally forms histograms for respective channels of R, G, and B. Then the histograms are equalized, and suitable binarization threshold values are obtained in consideration of these channel values. With reference to the binarization threshold values, the code divider 1010 divides the animated image into a binary format of black and white colors. When the code divider 1010 receives only a difference in signal strength of a brightness value similar to the case of a laser scanner, the animated image can be divided into a binary format of black and white colors according to a specific signal strength. Examples of other binarization methods include a locally adaptive thresholding method, an entropy thresholding method, and a spatial thresholding method.

After binarization, the code divider 1010 removes background area unnecessary for decoding, and removes a residual image from an area of the animated image code by using a length-based filtering method. The code divider 1010 detects boundary lines of respective objects from an image whose residual image has been removed. Thereafter, the code divider 1010 examines the connection between objects, and divides areas of the respective objects. The boundary lines of the divided areas are examined to find an area where an actual animated image code is present. The rest of the areas are preferably excluded in the operations below. A candidate code area which is deemed to be an area of the animated image code may be detected in order to reduce time and cost. If the candidate code area is not detected, a new binary threshold value is determined, and the residual image removal process is performed again.

The code divider 1010 detects a feature pattern (pattern analysis, feature point detection, outline detection, etc) from the candidate code area. An image code area based on the feature pattern is estimated and detected. For example, when a bar code is used, the code divider 1010 detects a guide pattern which shows a start point and an end point. When a two-dimensional image code is used, the code divider 1010 detects a finder pattern, an alignment pattern, and so on, each of which is arranged inside the code or at a vertex of the code. When a color code is used, the code divider 1010 detects vertex information and outline information of the code. In addition thereto, information on a set of a square, a rectangle, and a circle is detected. If the code area is not detected, a new binary threshold value is determined, and the process is performed again.

When the area of the animated image code is detected, the code divider 1010 divides the animated image code from the image code frame and the design layer. A method of dividing a code in which two layers are combined is disclosed in Korean Patent Application No. 2005-25239 and Korean Patent Application No. 2005-25240.

The decoder 1020 decodes an animated image code. The decoder 1020 decodes an image code frame, a design layer, and information based on the motion of the image code frame and the motion of the design layer. If the animated image code cannot be decoded, the decoder 1020 performs decoding by combining the animated image code with a previously received image code or an image code that is to be received next. For example, a left lower side of the image code frame currently received may be damaged, and thus a decoding process may be disabled. In this case, decoding may be carried out by replacing the damaged portion with an undamaged left lower portion of an image code frame that was previously received or that is to be received next.

Specifically, the frame image decoder 1022 uses information on a feature pattern of the image code frame, and thus extracts a code cell area of the image code frame. Then, the frame image decoder 1022 determines a central location of the code cell area, and extracts information on color, brightness, and gradation of pixels at the central location.

When a matrix code is used, the frame image decoder 1022 regards the information on color, brightness, and gradation of each code cell as cell information. When a layer code is used, a figure size is used as the cell information. When a pattern-based code is used, information on color, brightness, and gradation of a unit cell is used to obtain information on a pattern length.

The frame image decoder 1022 performs the decoding process by using information on a cell of the image code frame divided by the code divider 1010 and the information on a pattern length. If error handling information is present, the frame image decoder 1022 detects an error for a decoded value by using the error handling information. If an error correcting code is also present, error correction is carried out by using the error correcting code. If the error correction is not available, or a code has a size exceeding error-correction capacity, the code is not decoded.

The layer image decoder 1024 extracts a design component pattern of the design layer together with information on the design layer. Furthermore, the layer image decoder 1024 extracts a pattern based on a color distribution and an outline from the animated image code, and generates layer information by using the extracted pattern.

The varying image decoder 1026 reads the motion of the animated image code. Furthermore, the varying image decoder 1026 maps and interpolates image code areas of previous and next frames. When images are received more than 10 times per second, a positional difference in the animated image code may occur, caused by camera vibration. Therefore, if a difference between images in two frames is more severe than a level regarded as an acceptable error, the central location and the size of the animated image code are matched so as to have the same value. A distorted animated image code is processed in order to obtain a standardized code by using an interpolation method before the image code is matched. After the animated image code rotates, information on a rotation angle is additionally stored.

The varying image decoder 1026 extracts information on the motion of a design component when the motion occurs by comparing the matched frames with each other. When the design component moves significantly, information on respective motions is extracted. Each change in motion, rotation, and relative size is converted into information.

The service provider 1030 uses a decoded value when decoding is successful, and provides a service. Furthermore, the service provider 1030 synthesizes layer information based on pattern information with image code frame information, thereby creating new code information. Alternatively, the service provider 1030 uses both the layer information and the image code frame information.

Figure 11:
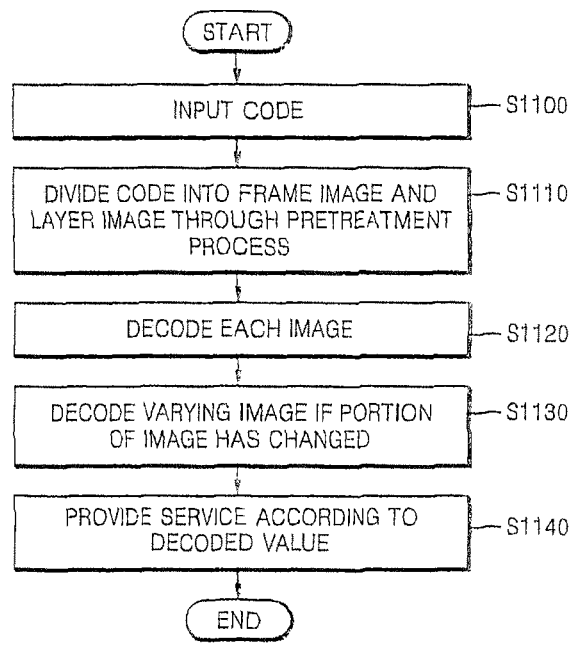
FIG. 11 is a flowchart of a method of decoding an animated image code according to an embodiment of the present invention.

FIG. 11 is a flowchart illustrating a method of decoding an animated image code according to an embodiment of the present invention.

Referring to FIG. 11, the animated image code displayed on the display medium is received optically, or received in the form of an electronic file (operation S1100). The received animated image code is divided into an image code frame and a design layer by a pretreatment process (operation S1110). The image code frame and the design layer are decoded (S1120). When motional changes in the animated image code are detected, information based on the motional changes is extracted in order to be decoded (operation S1130). After decoding is completed, a required service is provided according to a decoded value (operation S1140).

According to the present invention, a medium-friendly designed image code is provided through various display devices such as a television set (TV), a monitor, an electronic bulletin board, a mobile phone, a personal digital assistant (PDA), and a liquid crystal display (LCD). When decoding is difficult to carry out due to characteristics of a display medium or the occurrence of distortion, information of consecutive image code frames are combined, thereby improving decoding performance. Therefore, when an animated image code is expressed with pixels of the display medium, even if an image is blurred or distorted, the problem can be solved by combining consecutive images. Furthermore, distortion caused by a boundary line between pixels of the display medium and a luminance phenomenon caused by backlight can be prevented. For example, when a cathode ray tube (CRT)-type TV or monitor is used, a Moire phenomenon occurs, that is, a black or gray line appears on a screen.

The animated image code of the present invention can provide various information services in association with a digital television (DTV) and a computer. Examples of the services include a network information access service (e.g. advertisement information and a shopping mall), an information service related to sports broadcasting providing information on a player and game, a service for downloading a coupon and a scheduled recording service. In addition, the animated image code in which a color code is transformed becomes similar to a logo in terms of its shape and format. Therefore, an image code having a logo format can be achieved and recognized.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

The present invention relates to an image code displayed on a display medium.

The invention claimed is:

1. An apparatus for decoding an animated image code, the apparatus comprising:
   a code input unit which receives the animated image code displayed on a display medium optically or in the form of an electronic file;
   a code divider which divides the animated image code into an image code frame and a design layer; and
   a decoder which decodes the image code frame and extracts information based on the motion of the design layer, and
   wherein the code input unit continuously receives the animated image code at a predetermined time interval, and when a portion of the animated image code is damaged, resulting in the disabling of decoding, the decoder performs decoding by replacing the damaged portion with an undamaged portion of the animated image code that has been previously received or that is to be received next through the code input unit.

2. The apparatus of claim 1, wherein the decoder comprises: a frame image decoder which extracts and decodes color, gradation, and patterns of an area inside code cells of the image code frame; a layer image decoder which decodes an image code arranged in the design layer; and a varying image decoder which extracts information based on the motion of the image code frame and the motion of the design layer.

3. A method of decoding an animated image code, the method comprising the steps of:
   receiving the animated image code displayed on a display medium optically or in the form of an electronic file;
   dividing the animated image code into an image code frame and a design layer; and
   decoding the image code frame and extracting information based on the motion of the design layer, and
   wherein, the decoding comprises performing decoding by replacing a damaged portion with an undamaged portion of the animated image code that has been previously received or that is to be received next when a portion of the animated image code is damaged, resulting in the disabling of decoding.

* * * * *